United States Patent
McCall et al.

(10) Patent No.: US 6,508,122 B1
(45) Date of Patent: *Jan. 21, 2003

(54) MICROELECTROMECHANICAL SYSTEM FOR MEASURING ANGULAR RATE

(75) Inventors: Hiram McCall, Simi Valley, CA (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/662,438

(22) Filed: Sep. 15, 2000

Related U.S. Application Data (60) Provisional application No. 60/154,700, filed on Sep. 16, 1999.

(51) Int. Cl.[7] ................................................. G01P 9/04
(52) U.S. Cl. ........................ 73/504.12; 73/488; 702/147
(58) Field of Search ........................ 73/504.12, 504.13, 73/504.14, 504.15, 504.16, 504.04; 702/145, 147; 700/1, 73, 302, 303, 304; 701/1

(56) References Cited

U.S. PATENT DOCUMENTS

| | | | | |
|---|---|---|---|---|
| 5,131,749 A | * | 7/1992 | Varnham | 356/350 |
| 5,319,976 A | * | 6/1994 | Hulsing, II | 73/504.12 |
| 5,635,638 A | * | 6/1997 | Geen | 73/504.12 |
| 5,949,545 A | * | 9/1999 | Lo et al. | 356/350 |
| 5,983,718 A | * | 11/1999 | Wyse et al. | 73/504.12 |
| 6,311,555 B1 | * | 11/2001 | McCall et al. | 73/488 |

\* cited by examiner

*Primary Examiner*—Helen Kwok
(74) *Attorney, Agent, or Firm*—Raymond Y. Chan; David and Raymond Patent Group (57) ABSTRACT

A microelectromechanical system (MEMS) for measuring angular rate of a carrier includes an angular rate sensor unit, microelectronic circuitry, and signal processing to obtain highly accurate, sensitive, stable angular rate measurements of the carrier under dynamic environments. Wherein, the angular rate sensor unit receives dither driver signals, capacitive pickoff excitation signals, and displacement restoring signals to output angle rate signals in response to the motion of the carrier and dither motion signals; the central circuitry receives the angle rate signals in response to the motion of the carrier and dither motion signals to output angular rate signals and digital low frequency inertial element displacement signals; a digital signal processing system analyzes digital low frequency inertial element displacement signals to feed back the dither drive signals to the angular rate sensor unit.

16 Claims, 6 Drawing Sheets

MICROELECTROMECHANICAL SYSTEM FOR MEASURING ANGULAR RATE

CROSS REFERENCE OF RELATED APPLICATION

This is a regular application of a provisional application having an application No. of Ser. No. 60/154,700, filed on Sep. 16, 1999.

BACKGROUND OF THE PRESENT INVENTION

1. Field of the Present Invention

The present invention relates to a microelectromechanical system (MEMS), more particularly, relates to a microelectromechanical system (MEMS) to measure angular rate of a carrier. The system of the present invention includes an angular rate sensor unit, microelectronic circuitry, and signal processing to obtain a highly accurate, sensitive, stable angular rate measurement of the carrier under dynamic environments.

2. Description of Related Arts

An angular rate measurement can be obtained by employing a conventional gyro. Many types of approaches based on various sensing principles used to achieve an angular rate sensor have been invented in the past decades, are currently being invented, and will continue to be invented as the market for angular rate sensors continues to expand. For example, conventional spinning mass gyros are based principally on the Law of the Gyroscope. Existing ring laser gyros and Interferometric Fiber-Optic Gyros are dependant on the Sagnac Effects.

Conventional angular rate sensors have been commonly used in a wide variety of applications. However, their cost, size, and power prohibits their use in emerging commercial applications.

"MEMS" stands for "MicroElectroMechanical Systems", or small electrical/mechanical devices. MEMS devices involve creating controllable mechanical and movable structures using IC (Integrated Circuit) technologies. MEMS include the concepts of Microelectronics and Micromachining. Example MEMS devices include inkjet-printer cartridges, accelerometers that deploy car airbags, and miniature robots.

Microelectronics, the development of electronic circuitry on silicon chips, is a very well developed technology. Micromachining utilizes process technology developed by the integrated circuit industry to fabricate tiny sensors and actuators on silicon chips. In addition to shrinking the sensor size by several orders of magnitude, integrated electronics can be added to the same chip, creating an entire system on a chip. This instrument will result in, not only the redesign of conventional military products, but also new commercial applications that could not have existed without small, inexpensive inertial sensors.

Various MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, dual input axis MEMS angular rate sensors may be based on angular resonance of a rotating rigid rotor suspended by torsional springs. The inherent symmetry of the circular design allows angular rate measurement about two axes simultaneously.

However, it is still very challenging work to design and manufacture a MEMS angular rate sensor with high accuracy, keen sensitivity, wide dynamic range, and high stability.

SUMMARY OF THE PRESENT INVENTION

A main objective of the present invention is to provide a system to measure angular rate, wherein the angular rate sensor unit, microeleronic circuitry, and signal processing are fabricated into one silicon chip with the combination of surface micromachining layers of polysilicon and Integrated circuitry (IC) technology to obtain highly accurate, sensitive, stable angular rate measurements under dynamic environments.

Compared with existing MEMS angular rate sensors, the MEMS angular rate sensor of the present invention has several unique features that are described as follows:

1. Hinge to minimize number of resonance modes.
2. Mass distribution for resonance mode linearity.
3. Resonance mode locking circuitry.
4. Displacement regulation for scale factor stability.
5. Temperature stabilization for scale factor and bias stability.
6. Low mechanical damping through moderate vacuum.
7. Pickoff circuitry to minimize bias and scale factor shift.
8. The same driver comb used for both excitation and dither pickoff.
9. Closed loop design for scale factor linearity.

Another objective of the present invention is to provide a microelectromechanical system to measure angular rate. The present invention enables the core micro IMU, which has the following unique features:

(1) Attitude Heading Reference System (AHRS) Capable Core Sensor Module.
(2) Miniaturized (Length/Width/Height) and Light Weight.
(3) High Performance and Low Cost.
(4) Low Power Dissipation.
(5) Dramatic Improvement In Reliability (microelectromechanical systems—MEMS).

Another objective of the present invention is to provide a microelectromechanical system to measure angular rate. The present invention enables the core micro IMU to be incorporated into an integrated micro land navigator, which has the following unique features:

(1) Miniature, light weight, low power, low cost.
(2) AHRS, odometer, integrated GPS chipset and flux valve.
(3) Integration filter for sensor data fusion and zero velocity updating.
(4) Typical applications: automobiles, railway vehicles, miniature land vehicles, robots, unmanned ground vehicles, personal navigators, and military land vehicles.

Another objective of the present invention is to provide a microelectromechanical system to measure angular rate. The present invention enables the core micro IMU to function as aircraft inertial avionics, which has the following unique features:

(1) Rate Gyro
(2) Vertical Gyro
(3) Directional Gyro
(4) AHRS (5) IMU (6) Inertial Navigation System (7) Fully-Coupled GPS/MEMS IMU Integrated System (8) Fully-Coupled GPS/IMU/Radar Altimeter Integrated System (9) Universal vehicle navigation and control box.

Another objective of the present invention is to provide a microelectromechanical system to measure angular rate. The present invention enables the core micro IMU to be a Spaceborne MEMS IMU Attitude Determination System and a Spaceborne Fully-Coupled GPS/MEMS IMU Integrated system for orbit determination, attitude control, payload pointing, and formation flight, which has the following unique features:

(1) Shock resistant and vibration tolerant (2) High anti-jamming (3) High dynamic performance (4) Broad operating range of temperatures (5) High resolution (6) Compact, low power and light weight unit (7) Flexible hardware and software architecture Another objective of the present invention is to provide a microelectromechanical system to measure angular rate. The present invention enables the core micro IMU to be a marine INS with embedded GPS, which has the following unique features:

(1) Micro MEMS IMU AHRS with Embedded GPS (2) Built-in CDU (Control Display Unit)

(3) Optional DGPS (Differential GPS)

(4) Flexible Hardware and Software System Architecture (5) Low Cost, Light Weight, High Reliability Another objective of the present invention is to provide a microelectromechanical system to measure angular rate. The present invention enables the core micro IMU to be used in a micro pointing and stabilization mechanism, which has the following unique features:

(1) Micro MEMS IMU AHRS utilized for platform stabilization.

(2) MEMS IMU integrated with the electrical and mechanical design of the pointing and stabilization mechanism.

(3) Vehicle motion, vibration, and other interference cancelled by a stabilized platform.

(4) Variable pointing angle for tracker implementations.

(5) Micro MEMS IMU utilized for a micro fire control system for sniper rifles.

Typical applications: miniature antenna pointing and tracking control, laser beam pointing for optical communications, telescopic pointing for imaging, airborne laser pointing control for targeting, vehicle control and guidance.

The present invention can be used as a motion measurement device for both commercial and military systems requiring phased array antenna systems for communication on-the-move. Specific applications include pointing control systems for mobile satellite reception for truckers and radiotelephone and direct broadcast satellite reception. The development of a low cost attitude and heading reference system is critical to the wide deployment of these systems in the commercial arena.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

The present invention relates to a microelectromechanical system (MEMS), more particularly, relates to a microelectromechanical system (MEMS) to measure angular rates of a carrier.

Figure 1:
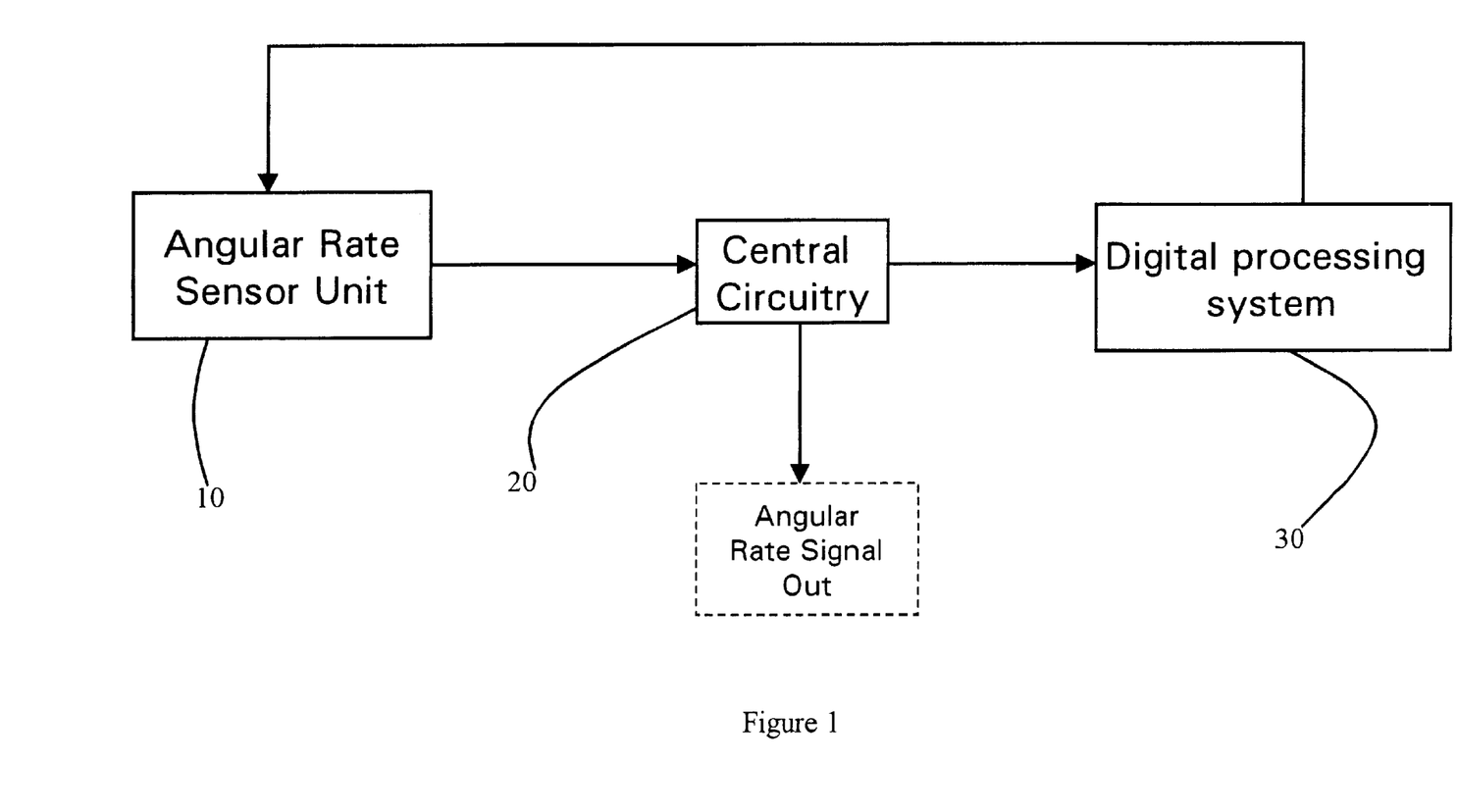
FIG. 1 shows the functional structure of the present invention.

Referring to FIG. 1, the system of the present invention includes an angular rate sensor unit 10, a central circuitry 20, and a digital signal processing system 30, which are fabricated into one chip using the combination of surface micromachining layers of polysilicon and Integrated circuitry (IC) technology to obtain highly accurate, sensitive, stable angular rate measurements under dynamic environments. A microelectromechanical system (MEMS) for measuring angular rates of a carrier of the present invention comprises:

1. an angular rate sensor unit 10, for receiving a dither driver signals, capacitive pickoff excitation signals and displacement restoring signals to output angle rate signals in response to the motion of the carrier and dither motion signals;

2. a central circuitry 20, for receiving the angle rate signals in response to the motion of the carrier and dither motion signals to output angular rate signals and digital low frequency inertial element displacement signals;

3. a digital signal processing system 30, for analyzing digital low frequency inertial element displacement signals to feed back the dither drive signals to the angular rate sensor unit 10.

The angular rate sensor unit can be a micromachined sensor unit. In principle, the present invention may incorporate with MEMS technology that employs a dynamic theory, Coriolis effect. The Coriolis effect can be seen that when an angular rate is applied to a translating body and a Coriolis force is generated. Its principle of operation and construction rely on a tuning fork that uses closed-loop capacitive sensing.

The MEMS of the present invention measures angular rate by picking-off a signal generated by an oscillating micromachined mass as it deviates from its plane of oscillation under the Coriolis force effect when the oscillating micromachined mass is submitted to a rotation about an axis perpendicular to the plane of oscillation.

Figure 2:
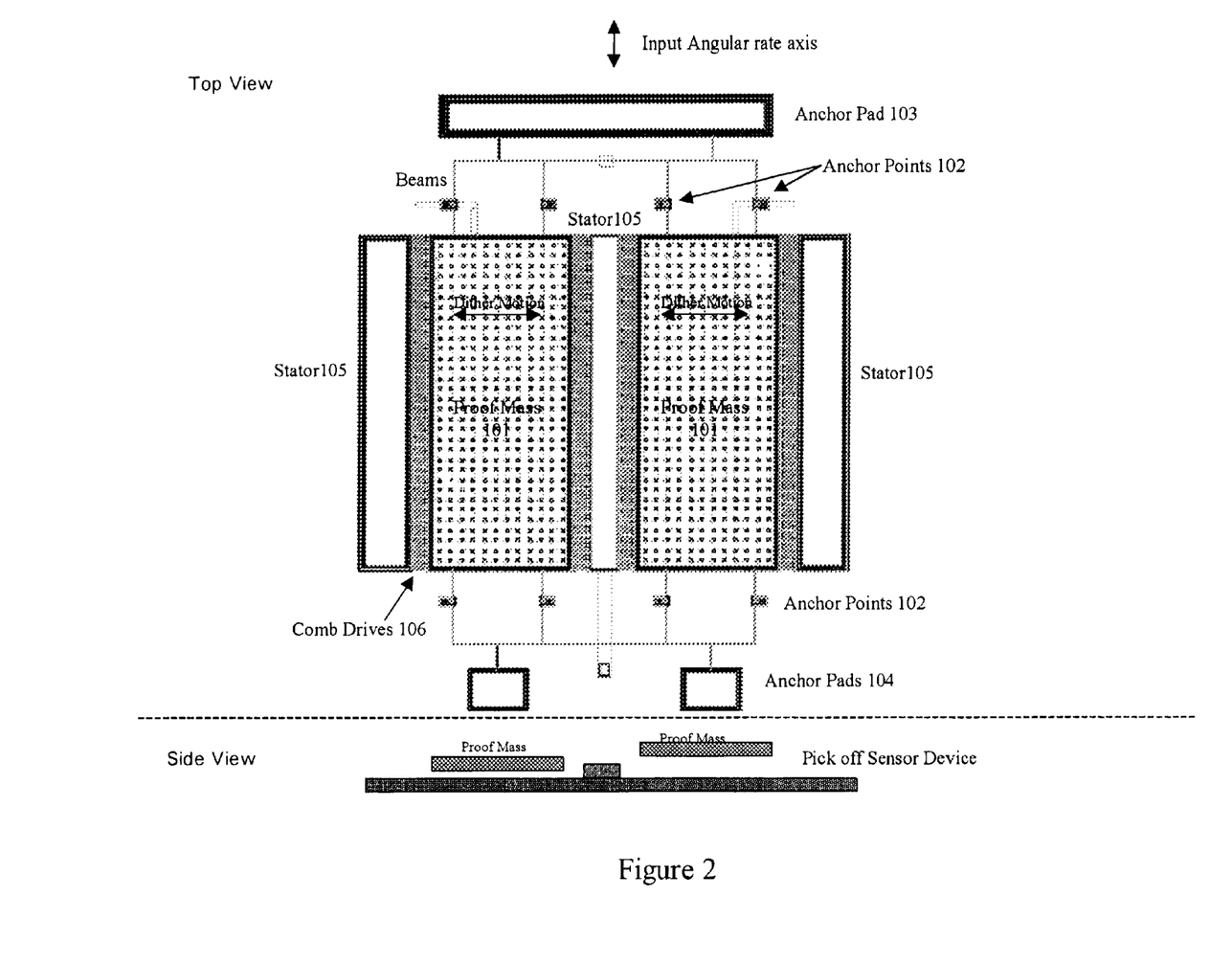
FIG. 2 shows the configuration of a Micromachined sensor unit.

Referring to FIG. 2, which illustrates the configuration of the micromachined sensor unit.

The micromachined sensor unit 10 consists of two vibration devices which have opposite dither motion directions. A pair of differential measurements are formed to eliminate the effect of the gravity and acceleration induced interference force. The proof masses are suspended by eight beams which also provide the elastic force for the vibration at the same time. The beams are attached to the substrate by anchors at the middle of the beams.

Two vibrating proof masses are attached by springs to each other and to the surrounding stationary material. The vibrating (dither) proof masses are driven in opposite directions by electrostatic comb drive motors to maintain lateral in-plane oscillation. The dither motion is in the plane of the wafer. When an angular rate is applied to the MEMS device about the input axis (which is in the plane of the tines), the proof masses are caused to oscillate out of plane by a Coriolis force due to the Coriolis effect. The resulting out-of-plane up and down oscillation motion amplitude, proportional to the input angular rate, is detected and measured by capacitive pickoff plates underneath the proof masses. The comb drives move the masses out of phase with respect to each other. The masses will then respond in opposite directions to the Corilois force.

The circuitry detects this perpendicular motion by measuring the change in capacitance. The sensitivity of the device is dependent on the amplitude of the dither motion, the frequency of the oscillation, the mass of the device and the detection method. The sensitivity is proportional to the product of the velocity of the device and the angular rate. Maximizing the amplitude and frequency of oscillation increases the sensitivity. To increase the amplitude of oscillation, the device is run at the resonant frequency of the supporting springs. This minimizes the energy required to drive the device. If the resonant frequency is too high (stiff springs) the perpendicular motion of the device is decreased. Typical resonant frequencies are 1000–3000 Hz. Some error can occur in the device if the dither motion is not truly linear.

The change in capacitance caused by the motion of the mass in response to a Coriolis force is determined by measuring the current flow from a high frequency signal (100 kHz to 1 MHz). The capacitance is on the order of 0.5 pf with changes in capacitance on the order of 1 ff. In order to achieve the greatest sensitivity, the design of the present invention places the electronics as close as possible to the pickoff electrodes on the device. In the MEMS of the present invention, this is done by either integrating the electronics on the same wafer as the micromachined sensor unit or by placing the electronics as close as possible to the sensor package. On chip electronics can detect changes in motion on the order of angstroms.

Referring to FIG. 2, the micromachined sensor unit 10 comprises:
1. two proof masses 101, which are attached with beam springs to eight anchor points 102 and driven by the three stators to oscillate to sense Coriolis force.
2. Eight anchor points 102, which are scattered both sides of the two proof masses and connected with the silicon substrate and to support the two proof masses through beam strings.
3. A large anchor pad 103, which is connected with the silicon substrate and is connected with the four anchor points 102 through beam strings to improve and stabilize the oscillation of the two proof masses.
4. Two small anchor pads 104, which are connected with the silicon substrate and are connected with the four anchor points 102 through beam strings to improve and stabilize the:oscillation of the two proof masses 101.
5. Three stators 105, which are connected with the silicon substrate and drive the two proof masses 101 through the comb drives 106.

When an angular rate is applied about the angular rate input axis of the micromachined sensor unit, the changed-capacitive signal can be sensed.

Figure 3:
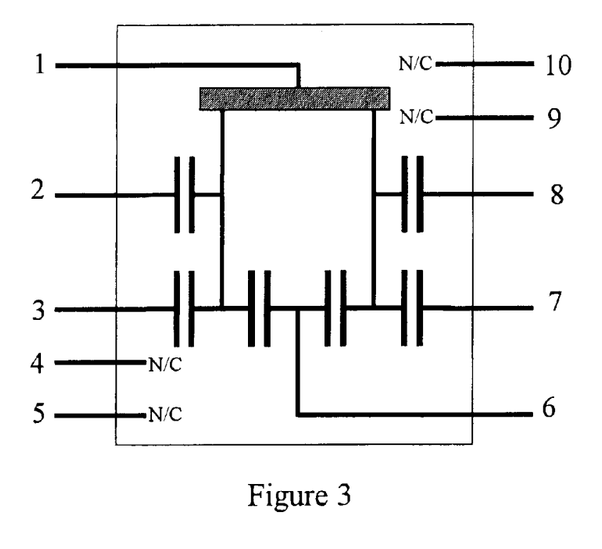
FIG. 3 shows variable capacitive signal pick off point connection design.

Referring to FIG. 3, a total of six capacitors are formed by the micromachined sensor unit structure. Among them four capacitors are formed by the two proof masses and three stators to construct four pair of drive combs for the vibration drive mechanism. Two capacitors are formed by two pair of proof masses and sensor electrodes. When there is an angular rate in the gyro input axis, one proof mass will move towards its electrode and the other moves away from its electrode under the Coriolis force. Thus the two sensor capacitors can be used to form a differential measurement circuit.

Two techniques are presently employed to fabricate MEMS devices; bulk micromachining and surface micromachining. The preferred MEMS fabrication of the present patent is the surface micromachining process. Surface micromachined devices are typically a few microns to 10 microns thick. Angular rate sensors created with surface machining have very low masses. The advantage of surface machining is the low cost and the ease of incorporating the electronics close to the sensor.

In surface micromachining, the sensor element is built onto the surface of a silicon wafer. To build a surface micromachined sensor, a few $\mu$m thick layer of sacrificial oxide is deposited on the passivation layer of a silicon wafer, in which $n^+$ wells have been previously diffused. Openings are then etched through both insulators to the diffused areas in the substrate. A thick layer of polysilicon is subsequently deposited over the entire sensor area, filling the openings and establishing both a mechanical and electrical bond with the $n^+$ diffused areas. The sensing elements are then etched into the layer of "floating" polysilicon. The sacrificial oxide is subsequently removed from under the polysilicon through further etching, leaving the polysilicon layer essentially suspended in mid-air, yet still attached to the substrate via the anchor posts, or pedestals, formed at the points of diffusion.

Surface micromachining starts with a wafer of material. In surface micromachining the wafer is the substrate—the working surface—on which multiple, alternating layers of structural and sacrificial material are deposited and etched. A typical cycle in a surface micromachining process begins with a deposition of either the sacrificial material, a material which will be completely removed in the final step of the fabrication process, or structural material, a material from which the functional components of the MEMS will be constructed. The layer is then masked with a desired pattern which is typically transferred using a photolithographic process, usually the exposure of a photosensitive material and development of the exposed photoresist. Next, the underlying material, not protected by the masking pattern, is etched, typically by reactive ion etching to transfer the mask pattern to that particular material layer. The deposition-masking-etching cycle is repeated on all laminated layers of structural and sacrificial materials until the MEMS angular rate sensor is complete. The final step in surface micromachining is the release of the structural material from the laminations by etching or removing the underlying and surrounding sacrificial materials.

The most commonly used surface micromachining processes start with silicon wafers of the same grade and type used in microelectronics fabrication and uses layers of silicon dioxide as the sacrificial material and layers of polysilicon, a deposited, less crystalline form of silicon, as the structural material. Other deposited materials such as silicon nitride, polyimides, and aluminum are also used to provide electrically insulating materials, conducting materials, etchant masks, and additional structural materials. All of these materials are extensively used and available in standard microelectronics fabrication.

Because of the laminated structural and sacrificial material layers and the etching of material done by a process that is insensitive to crystalline structure, either because of the etch or because the material itself is non-crystalline, surface micromachining enables the fabrication of free form, complex, and multi-component integrated MEMS structures, liberating the MEMS designer to envision and build devices and systems that are impossible to realize with bulk process. Surface micromachining also frees the process developer and device designer to choose any material system that has complementary structural and sacrificial materials. It is this freedom to fabricate devices and systems without constraints on materials, geometry, assembly and interconnections that is the source for the richness and depth of MEMS applications that cut across so many areas.

The major problem with angular rate sensors is reliably moving the masses. Unlike accelerometers that are passive devices, rate sensors are active devices. All actuation is done with electrostatic forces. These forces are very weak so something can impede the motion of the masses. Problems can occur from dust or from the device not being properly cleaned. The surface machined device is made by separating all moving parts with a sacrificial oxide. The final step in the processing is the removal of this oxide. Once the oxide is removed the etching solution has to be completely removed with water and then the water has to be removed with alcohol. The alcohol then has to be removed completely by drying the device. If the solutions are not properly removed than stiction occurs impeding the motion of the device making it unusable. The device can also be susceptible to the squeeze-film effect. If the device is run in the atmosphere the movement of the device can be impeded by the inability of the trapped gas to move when the device moves. These devices are packaged in a vacuum environment. Getters are employed in the package to maintain the quality of the vacuum. The use of a vacuum can degrade the device's resistance to shock. Air damping increases shock resistance.

Figure 4:
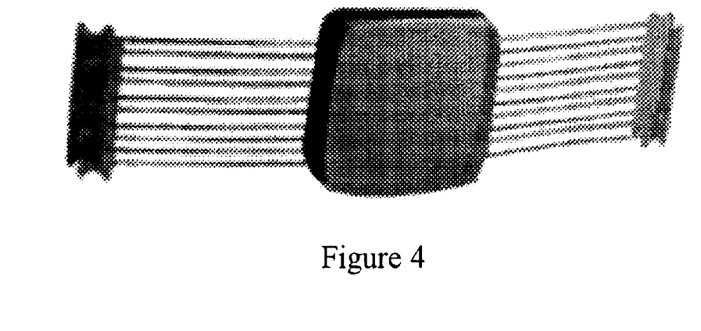
FIG. 4 shows a picture of the packaged MEMS angular rate sensor.

FIG. 4 shows a picture of the packaged MEMS angular sensor of the present invention.

Figure 5:
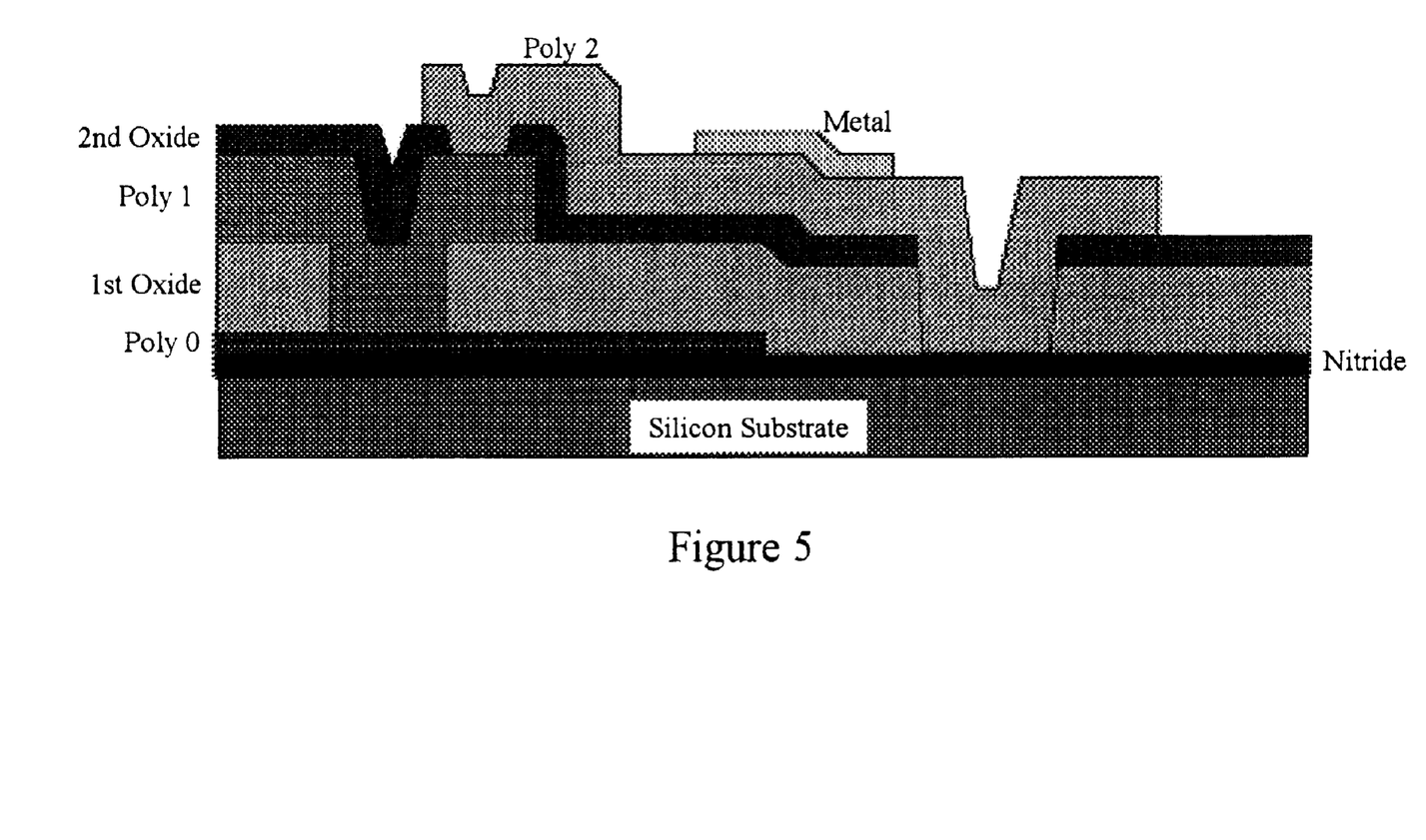
FIG. 5 illustrates cross sectional view showing layers of the surface machined fabrication process of a MEMS.

Referring to FIG. 5, which is a cross section of the three-layer polysilicon surface micromachining process. This process has the general features of a standard surface micromachining process: (1) polysilicon is used as the structural material, (2) deposited oxide (PSG) is used as the sacrificial layer, and silicon nitride is used as electrical isolation between the polysilicon and the substrate. The process is different from most customized surface micromachining processes in that it is designed to be as general as possible, and to be capable of supporting many different designs on a single silicon wafer. Since the process was not optimized with the purpose of fabricating any one specific device, the thickness of the structural and sacrificial layers were chosen to suit most users, and the layout design rules were chosen conservatively to guarantee the highest yield possible.

Figure 6:
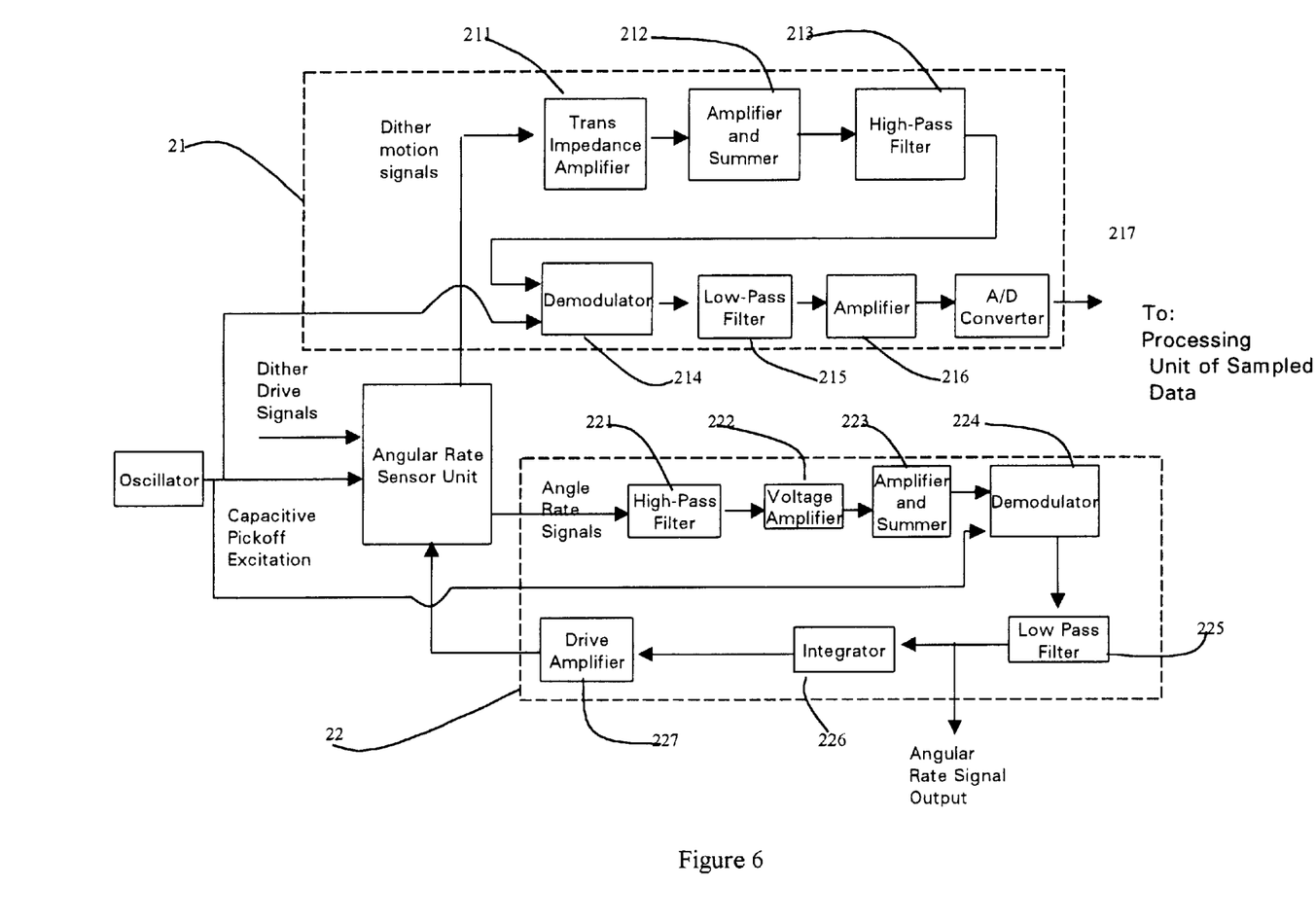
FIG. 6 shows the diagram of the central circuitry.

Referring to FIG. 6, the central circuitry 20 comprises a dither motion control circuitry 21 and an angle signal loop circuitry 22.

Referring to FIG. 6, the dither motion control circuitry 21 comprises:

a trans impedance amplifier circuit 211, connected to the angular rate sensor unit 10, for changing an output impedance of the dither motion signals from a very high level, greater than 100 million ohms, to a low level, less than 100 ohms to achieve two dither displacement signals which are A/C voltage signals representing the displacement between the inertial elements and the anchor combs;

a first amplifier and summer circuit 212, connected to the trans impedance amplifier circuit 211, for more than ten times amplifying the two dither displacement signals and enhancing the sensitivity for combining the two dither displacement signals to achieve a dither displacement differential signal by subtracting a center anchor comb signal with side anchor comb signals;

a first high-pass filter circuit 213, connected to the first amplifier and summer circuit 211, for removing residual dither drive signals and noise from the dither displacement differential signal to a filtered dither displacement differential signal;

a demodulator circuit 214, connected to the high-pass filter circuit 213, for receiving the capacitive pickoff excitation signals as phase reference signals from an oscillator and the filter dither displacement differential signal from the first high-pass filter, and extracting the in-phase portion of the filtered dither displacement differential signal to produce an inertial element displacement signal with known phase;

a first low-pass filter 215, connected to the demodulator circuit 214, for removing high frequency noise from the inertial element displacement signal input to form a low frequency inertial element displacement signal with bandwidth less than 3000 Hz;

an amplifier 216, connected with the first low-pass filter 215, for amplifying the filtered low frequency inertial element displacement signal;

an analog/digital converter 217, connected to amplifier 216, for converting the low frequency inertial element displacement signal that is an analog signal to produce a digitized low frequency inertial element displacement signal as a digital sampled signal.

Referring to FIG. 6, the angle rate signal loop circuitry 22 comprises:

a second high-pass filter circuit 221, connected to the angular rate sensor unit 10, for removing low frequency noise of the angle rate signals which are voltage signals output from the angular rate sensor unit thereto to form filtered angle rate signals;

a voltage amplifier circuit 222, connected to the second high-pass filter circuit 221, for amplifying the filtered angle rate signals to an extent of at least 100 milivolts to form amplified angle rate signals;

an amplifier and summer circuit 223, connected to the voltage amplifier circuit 222, for subtracting the difference between the angle rates of the amplified angle rate signals to produce a differential angle rate signal;

a demodulator 224, connected to the amplifier and summer circuit 223, for extracting the amplitude of the in-phase differential angle rate signal from the differential angle rate signal and the reference signal from the oscillator.

a low-pass filter 225, connected to the demodulator 224, for removing the high frequency noises of the amplitude signal of the in-phase differential angle rate signal to forms angular rate signal output.

an integrator 226, connected with the low-pass filter, for integrating the angular rate signal to form a displacement restoring signal without an offset.

a driver amplifier 227, connected to the integrator 226, for amplifying the displacement restoring signal without an offset to form a driving signal to the angular rate sensor unit 10.

Figure 7:
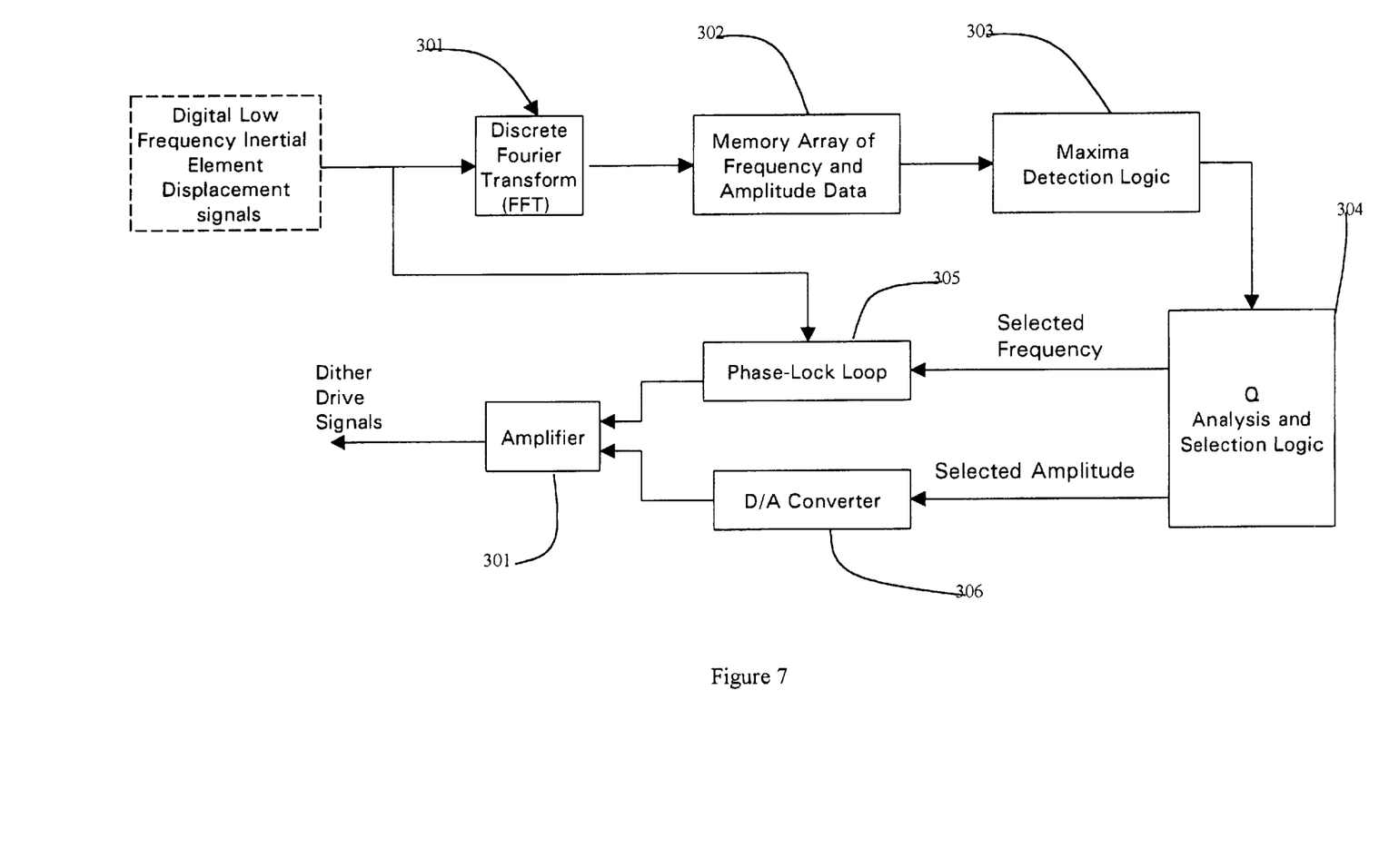
FIG. 7 shows the diagram of the digital processing system

Referring to FIG. 7, the digital signal processing system 30 comprises:

a discrete Fast Fourier Transform (FFT) module 301, receiving the digitized low frequency inertial element displacement signal from the analog/digital converter of dither motion control circuitry 21 to form amplitude data with the frequency spectrum of the input inertial element displacement signal.

a memory array of frequency and amplitude data module 302, receiving the amplitude data with frequency spectrum to form an array of amplitude data with frequency spectrum.

a maxima detection logic module 303 to process the array of the amplitude data with frequency spectrum to choose those frequencies with the largest amplitudes in the local segment of the frequency spectrum from the array of the amplitude data with frequency spectrum.

a Q analysis and selection logic module 304 to perform Q analysis on the chosen frequencies to selecte frequency and amplitude by computing the ratio of amplitude/area. The range for computing area is between +−½ of the peek for each maximum frequency point.

a phase-lock loop 305 to serve as a very narrow bandpass filter to reject noise of the selected frequency and to generate a dither drive signal with the selected frequency.

a D/A converter 306 to process the selected amplitude to form a dither drive signal with correct amplitude.

an amplifier 307 to generate and amplify the dither drive signal to the angular rate sensor unit based on the dither drive signal with the selected frequency and correct amplitude.

What is claimed is:

1. A microelectromechanical system (MEMS) for measuring angular rate of a carrier, comprising:

an angular rate sensor unit receiving dither driver signals, capacitive pickoff excitation signals and a displacement restoring signal and outputting angle rate signals in response to motion of said carrier and dither motion signals;

a central circuitry receiving said angle rate signals in response to said motion of said carrier and said dither motion signals and outputting angular rate signals and digital low frequency inertial element displacement signals; and a digital signal processing system analyzing said digital low frequency inertial element displacement signals and feeding back said dither driver signals to said angular rate sensor unit.

2. The microelectromechanical system, as recited in claim 1, wherein said angular rate sensor unit further comprises:

a silicon substrate;

two proof masses which is arranged to be caused a oscillation out of plane by a Coriolis force to sense said motion of said carrier in accordance with Coriolis effect three stators connected with said silicon substrate, wherein one of said stators is connected between inner sides of said two proof masses through two comb drives respectively while other two of said stators are connected with outer sides of said two proof masses through another two comb drives;

a first anchor pad, which is connected with said silicon substrate;

two second anchor pads, which are connected with said silicon substrate; and a first set and a second set of anchor points connected with said silicon substrate, wherein said first set of anchor points is scattered one end of said two proof masses and connected with said first anchor pad through a first set of beam strings, and said second set of anchor points is scattered another end of said two proof masses and connected with said second anchor pads through a second set of beam strings, so as to enhance and stabilize said oscillation of said two proof masses.

3. The microelectromechanical system, as recited in claim 1, wherein said central circuitry comprises a dither motion control circuitry and an angle rate signal loop circuitry.

4. The microelectromechanical system, as recited in claim 2, wherein said central circuitry comprises a dither motion control circuitry and an angle rate signal loop circuitry.

5. The microelectromechanical system, as recited in claim 3, wherein said dither motion control circuitry comprises:

a trans impedance amplifier circuit, which is connected to said angular rate sensor unit, changing an output impedance of said dither motion signals from a very high level, greater than 100 million ohms, to a low level, less than 100 ohms, to achieve two dither displacement signals, which are A/C voltage signals, representing a displacement between inertial elements and anchor combs;

a first amplifier and summer circuit, which is connected to said trans impedance amplifier circuit, amplifying said two dither displacement signals by at least ten times and enhancing a sensitivity for combining said two dither displacement signals to achieve a dither displacement differential signal by subtracting a center anchor comb signal with a side anchor comb signal;

a first high-pass filter circuit, which is connected to said first amplifier and summer circuit, removing residual dither drive signals and noise from said dither displacement differential signal to form a filtered dither displacement differential signal;

a demodulator circuit, which is connected to said first high-pass filter circuit, receiving said capacitive pickoff excitation signals as phase reference signals from an oscillator and said filtered dither displacement differential signal from said first high-pass filter, and extracting an in-phase portion of said filtered dither displacement differential signal to produce an inertial element displacement signal with a known phase;

a first low-pass filter, which is connected to said demodulator circuit, removing a high frequency noise from said inertial element displacement signal inputted thereto to form a filtered low frequency inertial element displacement signal with a bandwidth less than 3000 Hz;

an amplifier, which is connected with said first low-pass filter, amplifying said filtered low frequency inertial element displacement signal; and an analog/digital converter, which is connected to said amplifier, converting said filtered low frequency inertial element displacement signal that is an analog signal to produce a digitized filtered low frequency inertial element displacement signal as a digital sampled signal.

6. The microelectromechanical system, as recited in claim 4, wherein said dither motion control circuitry comprises:

a trans impedance amplifier circuit, which is connected to said angular rate sensor unit, changing an output impedance of said dither motion signals from a very high level, greater than 100 million ohms, to a low level, less than 100 ohms, to achieve two dither displacement signals, which are A/C voltage signals, representing a displacement between inertial elements and anchor combs;

a first amplifier and summer circuit, which is connected to said trans impedance amplifier circuit, amplifying said two dither displacement signals by at least ten times and enhancing a sensitivity for combining said two dither displacement signals to achieve a dither displacement differential signal by subtracting a center anchor comb signal with a side anchor comb signal;

a first high-pass filter circuit, which is connected to said first amplifier and summer circuit, removing residual dither drive signals and noise from said dither displacement differential signal to form a filtered dither displacement differential signal;

a demodulator circuit, which is connected to said first high-pass filter circuit, receiving said capacitive pickoff excitation signals as phase reference signals from an oscillator and said filtered dither displacement differential signal from said first high-pass filter, and extracting an in-phase portion of said filtered dither displacement differential signal to produce an inertial element displacement signal with a known phase;

a first low-pass filter, which is connected to said demodulator circuit, removing a high frequency noise from said inertial element displacement signal inputted thereto to form a filtered low frequency inertial element displacement signal with a bandwidth less than 3000 Hz;

an amplifier, which is connected with said first low-pass filter, amplifying said filtered low frequency inertial element displacement signal; and an analog/digital converter, which is connected to said amplifier, converting said filtered low frequency inertial element displacement signal that is an analog signal to produce a digitized filtered low frequency inertial element displacement signal as a digital sampled signal.

7. The microelectromechanical system, as recited in claim 3, wherein said angle rate signal loop circuitry comprises:

a second high-pass filter circuit, which is connected to said angular rate sensor unit, removing low frequency noise of said angle rate signals which are voltage signals outputted from said angular rate sensor unit thereto to form filtered angle rate signals;

a voltage amplifier circuit, which is connected to said second high-pass filter circuit, amplifying said filtered angle rate signals to an extent of at least 100 milivolts to form amplified angle rate signals;

an amplifier and summer circuit, which is connected to said voltage amplifier circuit, subtracting a difference between angle rates of said amplified angle rate signals to produce a differential angle rate signal;

a demodulator, which is connected to said amplifier and summer circuit, extracting an amplitude of an in-phase differential angle rate signal from said differential angle rate signal and a reference signal from an oscillator;

a low-pass filter, which is connected to said demodulator, removing high frequency noises of an amplitude signal of said in-phase differential angle rate signal to form an angular rate signal output;

an integrator, which is connected with said low-pass filter, integrating said angular rate signal to form a displacement restoring signal without an offset; and a driver amplifier, which is connected to said integrator, amplifying said displacement restoring signal without said offset to form a driving signal to said angular rate sensor unit.

8. The microelectromechanical system, as recited in claim 4, wherein said angle rate signal loop circuitry comprises:

a second high-pass filter circuit, which is connected to said angular rate sensor unit, removing low frequency noise of said angle rate signals which are voltage signals outputted from said angular rate sensor unit thereto to form filtered angle rate signals;

a voltage amplifier circuit, which is connected to said second high-pass filter circuit, amplifying said filtered angle rate signals to an extent of at least 100 milivolts to form amplified angle rate signals;

an amplifier and summer circuit, which is connected to said voltage amplifier circuit, subtracting a difference between angle rates of said amplified angle rate signals to produce a differential angle rate signal;

a demodulator, which is connected to said amplifier and summer circuit, extracting an amplitude of an in-phase differential angle rate signal from said differential angle rate signal and a reference signal from an oscillator;

a low-pass filter, which is connected to said demodulator, removing high frequency noises of an amplitude signal of said in-phase differential angle rate signal to form an angular rate signal output;

an integrator, which is connected with said low-pass filter, integrating said angular rate signal to form a displacement restoring signal without an offset; and a driver amplifier, which is connected to said integrator, amplifying said displacement restoring signal without said offset to form a driving signal to said angular rate sensor unit.

9. The microelectromechanical system, as recited in claim 5, wherein said angle rate signal loop circuitry comprises:

a second high-pass filter circuit, which is connected to said angular rate sensor unit, removing low frequency noise of said angle rate signals which are voltage signals outputted from said angular rate sensor unit thereto to form filtered angle rate signals;

a voltage amplifier circuit, which is connected to said second high-pass filter circuit, amplifying said filtered angle rate signals to an extent of at least 100 milivolts to form amplified angle rate signals;

an amplifier and summer circuit, which is connected to said voltage amplifier circuit, subtracting a difference between angle rates of said amplified angle rate signals to produce a differential angle rate signal;

a demodulator, which is connected to said amplifier and summer circuit, extracting an amplitude of an in-phase differential angle rate signal from said differential angle rate signal and a reference signal from said oscillator;

a low-pass filter, which is connected to said demodulator, removing high frequency noises of an amplitude signal of said in-phase differential angle rate signal to form an angular rate signal output;

an integrator, which is connected with said low-pass filter, integrating said angular rate signal to form a displacement restoring signal without an offset; and a driver amplifier, which is connected to said integrator, amplifying said displacement restoring signal without said offset to form a driving signal to said angular rate sensor unit.

10. The microelectromechanical system, as recited in claim 6, wherein said angle rate signal loop circuitry comprises:

a second high-pass filter circuit, which is connected to said angular rate sensor unit, removing low frequency noise of said angle rate signals which are voltage signals outputted from said angular rate sensor unit thereto to form filtered angle rate signals;

a voltage amplifier circuit, which is connected to said second high-pass filter circuit, amplifying said filtered angle rate signals to an extent of at least 100 milivolts to form amplified angle rate signals;

an amplifier and summer circuit, which is connected to said voltage amplifier circuit, subtracting a difference between angle rates of said amplified angle rate signals to produce a differential angle rate signal;

a demodulator, which is connected to said amplifier and summer circuit, extracting an amplitude of an in-phase differential angle rate signal from said differential angle rate signal and a reference signal from said oscillator;

a low-pass filter, which is connected to said demodulator, removing high frequency noises of an amplitude signal of said in-phase differential angle rate signal to form an angular rate signal output;

an integrator, which is connected with said low-pass filter, integrating said angular rate signal to form a displacement restoring signal without an offset; and a driver amplifier, which is connected to said integrator, amplifying said displacement restoring signal without said offset to form a driving signal to said angular rate sensor unit.

11. The microelectromechanical system, as recited in claim 5, wherein said digital signal processing system comprises:

a discrete Fast Fourier Transform (FFT) module, receiving said digitized filtered low frequency inertial element displacement signal from said analog/digital converter of said dither motion control circuitry to form amplitude data with frequency spectrum of said inertial element displacement signal inputted;

a memory array of frequency and amplitude data module, receiving said amplitude data with said frequency spectrum to form an array of said amplitude data with said frequency spectrum;

a maxima detection logic module, processing said array of said amplitude data with said frequency spectrum to choose frequencies having largest amplitudes in a local segment of said frequency spectrum from said array of said amplitude data;

an analysis and selection logic module to perform an analysis on said frequencies being chosen to select a selected frequency and a correct amplitude by computing a ratio of amplitude/area, wherein a frequency range for computing area is between +½ and −½ of a peek for each maximum frequency point;

a phase-lock loop served as a very narrow bandpass filter to reject noise of said frequency being selected to form one of said dither driver signals that contains said selected frequency;

a D/A converter, processing said amplitude being selected to form one of said dither driver signals that contains said correct amplitude; and an amplifier generating and amplifying said dither driver signals to said angular rate sensor unit based on said dither driver signals containing said selected frequency and said correct amplitude.

12. The microelectromechanical system, as recited in claim 6, wherein said digital signal processing system comprises:

a discrete Fast Fourier Transform (FFT) module, receiving said digitized filtered low frequency inertial element displacement signal from said analog/digital converter of said dither motion control circuitry to form amplitude data with frequency spectrum of said inertial element displacement signal inputted;

a memory array of frequency and amplitude data module, receiving said amplitude data with said frequency spectrum to form an array of said amplitude data with said frequency spectrum;

a maxima detection logic module, processing said array of said amplitude data with said frequency spectrum to choose frequencies having largest amplitudes in a local segment of said frequency spectrum from said array of said amplitude data;

an analysis and selection logic module to perform an analysis on said frequencies being chosen to select a selected frequency and a correct amplitude by computing a ratio of amplitude/area, wherein a frequency range for computing area is between +½ and −½ of a peek for each maximum frequency point;

a phase-lock loop served as a very narrow bandpass filter to reject noise of said frequency being selected to form one of said dither driver signals that contains said selected frequency;

a D/A converter, processing said amplitude being selected to form one of said dither driver signals that contains said correct amplitude; and an amplifier generating and amplifying said dither driver signals to said angular rate sensor unit based on said dither driver signals containing said selected frequency and said correct amplitude.

13. The microelectromechanical system, as recited in claim 7, wherein said digital signal processing system comprises:

a discrete Fast Fourier Transform (FFT) module, receiving said digitized filtered low frequency inertial element displacement signal from said analog/digital converter of said dither motion control circuitry to form amplitude data with frequency spectrum of said inertial element displacement signal inputted;

a memory array of frequency and amplitude data module, receiving said amplitude data with said frequency spectrum to form an array of said amplitude data with said frequency spectrum;

a maxima detection logic module, processing said array of said amplitude data with said frequency spectrum to choose frequencies having largest amplitudes in a local segment of said frequency spectrum from said array of said amplitude data;

an analysis and selection logic module to perform an analysis on said frequencies being chosen to select a selected frequency and a correct amplitude by computing a ratio of amplitude/area, wherein a frequency range for computing area is between +½ and −½ of a peek for each maximum frequency point;

a phase-lock loop served as a very narrow bandpass filter to reject noise of said frequency being selected to form one of said dither driver signals that contains said selected frequency;

a D/A converter, processing said amplitude being selected to form one of said dither driver signals that contains said correct amplitude; and an amplifier generating and amplifying said dither driver signals to said angular rate sensor unit based on said dither driver signals containing said selected frequency and said correct amplitude.

14. The microelectromechanical system, as recited in claim 8, wherein said digital signal processing system comprises:

a discrete Fast Fourier Transform (FFT) module, receiving said digitized filtered low frequency inertial element displacement signal from said analog/digital converter of said dither motion control circuitry to form amplitude data with frequency spectrum of said inertial element displacement signal inputted;

a memory array of frequency and amplitude data module, receiving said amplitude data with said frequency spectrum to form an array of said amplitude data with said frequency spectrum;

a maxima detection logic module, processing said array of said amplitude data with said frequency spectrum to choose frequencies having largest amplitudes in a local segment of said frequency spectrum from said array of said amplitude data;

an analysis and selection logic module to perform an analysis on said frequencies being chosen to select a selected frequency and a correct amplitude by computing a ratio of amplitude/area, wherein a frequency range for computing area is between +½ and −½ of a peek for each maximum frequency point;

a phase-lock loop served as a very narrow bandpass filter to reject noise of said frequency being selected to form one of said dither driver signals that contains said selected frequency;

a D/A converter, processing said amplitude being selected to form one of said dither driver signals that contains said correct amplitude; and an amplifier generating and amplifying said dither driver signals to said angular rate sensor unit based on said dither driver signals containing said selected frequency and said correct amplitude.

15. The microelectromechanical system, as recited in claim 9, wherein said digital signal processing system comprises:

a discrete Fast Fourier Transform (FFT) module, receiving said digitized filtered low frequency inertial element displacement signal from said analog/digital converter of said dither motion control circuitry to form amplitude data with frequency spectrum of said inertial element displacement signal inputted;

a memory array of frequency and amplitude data module, receiving said amplitude data with said frequency spectrum to form an array of said amplitude data with said frequency spectrum;

a maxima detection logic module, processing said array of said amplitude data with said frequency spectrum to choose frequencies having largest amplitudes in a local segment of said frequency spectrum from said array of said amplitude data;

an analysis and selection logic module to perform an analysis on said frequencies being chosen to select a selected frequency and a correct amplitude by computing a ratio of amplitude/area, wherein a frequency range for computing area is between +½ and −½ of a peek for each maximum frequency point;

a phase-lock loop served as a very narrow bandpass filter to reject noise of said frequency being selected to form one of said dither driver signals that contains said selected frequency;

a D/A converter, processing said amplitude being selected to form one of said dither driver signals that contains said correct amplitude; and an amplifier generating and amplifying said dither driver signals to said angular rate sensor unit based on said dither driver signals containing said selected frequency and said correct amplitude.

16. The microelectromechanical system, as recited in claim 10, wherein said digital signal processing system comprises:

a discrete Fast Fourier Transform (FFT) module, receiving said digitized filtered low frequency inertial element displacement signal from said analog/digital converter of said dither motion control circuitry to form amplitude data with frequency spectrum of said inertial element displacement signal inputted;

a memory array of frequency and amplitude data module, receiving said amplitude data with said frequency spectrum to form an array of said amplitude data with said frequency spectrum;

a maxima detection logic module, processing said array of said amplitude data with said frequency spectrum to choose frequencies having largest amplitudes in a local segment of said frequency spectrum from said array of said amplitude data;

an analysis and selection logic module to perform an analysis on said frequencies being chosen to select a selected frequency and a correct amplitude by computing a ratio of amplitude/area, wherein a frequency range for computing area is between +½ and −½ of a peek for each maximum frequency point;

a phase-lock loop served as a very narrow bandpass filter to reject noise of said frequency being selected to form one of said dither driver signals that contains said selected frequency;

a D/A converter, processing said amplitude being selected to form one of said dither driver signals that contains said correct amplitude; and an amplifier generating and amplifying said dither driver signals to said angular rate sensor unit based on said dither driver signals containing said selected frequency and said correct amplitude.

* * * * *